(12) United States Patent
Adachi et al.

(10) Patent No.: US 9,182,821 B2
(45) Date of Patent: Nov. 10, 2015

(54) ELECTRONIC DEVICE, INFORMATION PROVIDING SYSTEM, AND METHOD FOR CONTROLLING ELECTRONIC DEVICE

(71) Applicant: PANASONIC CORPORATION, Osaka (JP)

(72) Inventors: Yusuke Adachi, Osaka (JP); Masahiro Inata, Hyogo (JP); Ryo Okumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 259 days.

(21) Appl. No.: 13/875,850

(22) Filed: May 2, 2013

(65) Prior Publication Data

US 2014/0104203 A1 Apr. 17, 2014

(30) Foreign Application Priority Data

Oct. 15, 2012 (JP) .................................. 2012-227704
Jan. 28, 2013 (JP) .................................. 2013-013113

(51) Int. Cl.
*G06F 3/01* (2006.01)
*B60K 37/00* (2006.01)
*B64D 11/00* (2006.01)

(52) U.S. Cl.
CPC .............. *G06F 3/016* (2013.01); *B60K 37/00* (2013.01); *B64D 11/0015* (2013.01); *G06F 2203/014* (2013.01)

(58) Field of Classification Search
CPC ......... G09G 5/00; G06F 17/00; G06F 1/1626; B64D 11/0015; G01C 21/3602; G06Q 10/10
USPC .................... 345/173, 502; 340/963; 701/200
See application file for complete search history.

(56) References Cited

U.S. PATENT DOCUMENTS

| 6,954,657 | B2 * | 10/2005 | Bork et al. .................... 455/567 |
| 8,355,951 | B1 * | 1/2013 | Daniel ........................ 705/14.69 |
| 2005/0093868 | A1 * | 5/2005 | Hinckley ...................... 345/502 |
| 2007/0080951 | A1 * | 4/2007 | Maruyama et al. ........... 345/173 |
| 2009/0082951 | A1 * | 3/2009 | Graessley ..................... 701/200 |
| 2009/0288123 | A1 * | 11/2009 | Havlovick et al. .............. 725/77 |
| 2013/0138424 | A1 * | 5/2013 | Koenig et al. .................... 704/9 |

FOREIGN PATENT DOCUMENTS

JP 2005-335629 A 12/2005

* cited by examiner

*Primary Examiner* — Dwayne Bost
*Assistant Examiner* — Chineyere Wills-Burns
(74) *Attorney, Agent, or Firm* — McDermott Will & Emery LLP

(57) ABSTRACT

An electronic device 10 includes a touch panel 11, a vibration section 13 configured to vibrate a touch panel 11, and a control sections 20 and 33 configured to control the vibration section 13 based on an existence state of persons other than an operator of the electronic device 10 and being near to the electronic device 10.

19 Claims, 9 Drawing Sheets

| No | DEGREE OF CROWDING NEAR USER SEAT | VIBRATION RESTRICTION CONDITION |
|---|---|---|
| 1 | HIGH | UPPER LIMIT VIBRATION=5 μm |
| 2 | MEDIUM | UPPER LIMIT VIBRATION=10 μm |
| 3 | LOW | UPPER LIMIT VIBRATION=20 μm |

Fig. 9

ELECTRONIC DEVICE, INFORMATION PROVIDING SYSTEM, AND METHOD FOR CONTROLLING ELECTRONIC DEVICE

BACKGROUND OF THE INVENTION

1. Field of the Invention

The present disclosure relates to an electronic device including a vibration section configured to vibrate a touch panel, an information providing system including the electronic device, and a method for controlling the electronic device.

2. Description of the Background Art

Japanese Laid-Open Patent Publication No. 2005-335629 discloses an operation device for a vehicle which presents appropriate vibration to an operator of a vehicle, in accordance with the operator's driving condition.

This operation device for a vehicle includes a control section which determines, based on a drive state of the vehicle, whether the operator of a touch panel of the device is concentrating on driving the vehicle. Accordingly, the operation device can present appropriate vibration to the operator of the vehicle, in accordance with the driving condition.

SUMMARY OF THE INVENTION

The present disclosure provides an electronic device including a vibration section configured to vibrate a touch panel, the electronic device capable of making vibration generated by the vibration section difficult to be sensed by persons other than the operator of the electronic device.

The electronic device according to the present disclosure includes a touch panel, a vibration section configured to vibrate the touch panel, and a control section configured to control the vibration section based on an existence state of one or more persons other than an operator of the electronic device and being near to the electronic device.

The electronic device according to the present disclosure can make vibration generated by the vibration section difficult to be sensed by persons other than the operator of the electronic device.

BRIEF DESCRIPTION OF THE DRAWINGS

FIG. 2 is a side view of a seat where a person C of FIG. 1 is seated, and the like;

FIG. 9 shows an example of a control table for a vibration section.

DESCRIPTION OF THE PREFERRED EMBODIMENTS

Hereinafter, the present embodiment will be described in detail with reference to the drawings as appropriate. However, there will be instances in which detailed description beyond what is necessary is omitted. For example, detailed description of subject matter that is previously well-known, as well as redundant description of components that are substantially the same, will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

(Embodiment 1)

Hereinafter, the present embodiment will be described with reference to FIGS. 1 to 9. An information providing system of the present embodiment is a system which includes a plurality of electronic devices connected to a management device (server) and in which the management device and the like provide information to an operator of each electronic device. The information providing system is installed in a construction (such as movable carrier and movie theater) with space in which a plurality of seats are provided. The electronic device is provided to each seat. The management device may be installed in the construction with space in which the plurality of seats are provided, or in a place other than the construction.

[1-1. Configuration]

<Overall Configuration of Display System>

First, a configuration of the information providing system (display system) of the present embodiment will be described with reference to FIG. 1 and FIG. 2.

In the present embodiment, as an exemplary information providing system, an information providing system (display system) in which electronic devices 10 are installed in an aircraft 100 will be described. In the present embodiment, as an ambient environment near each electronic device 10, a person presence state regarding seats near (around) the seat (hereinafter may be referred to as "user seat") where the operator operating the electronic device 10 is seated is used for controlling a vibration section 13 described later. Herein, "near electronic device 10" means a range in which a person can sense vibration (e.g., vibration at a maximum amplitude) generated by the vibration section 13 described later.

Figure 1:
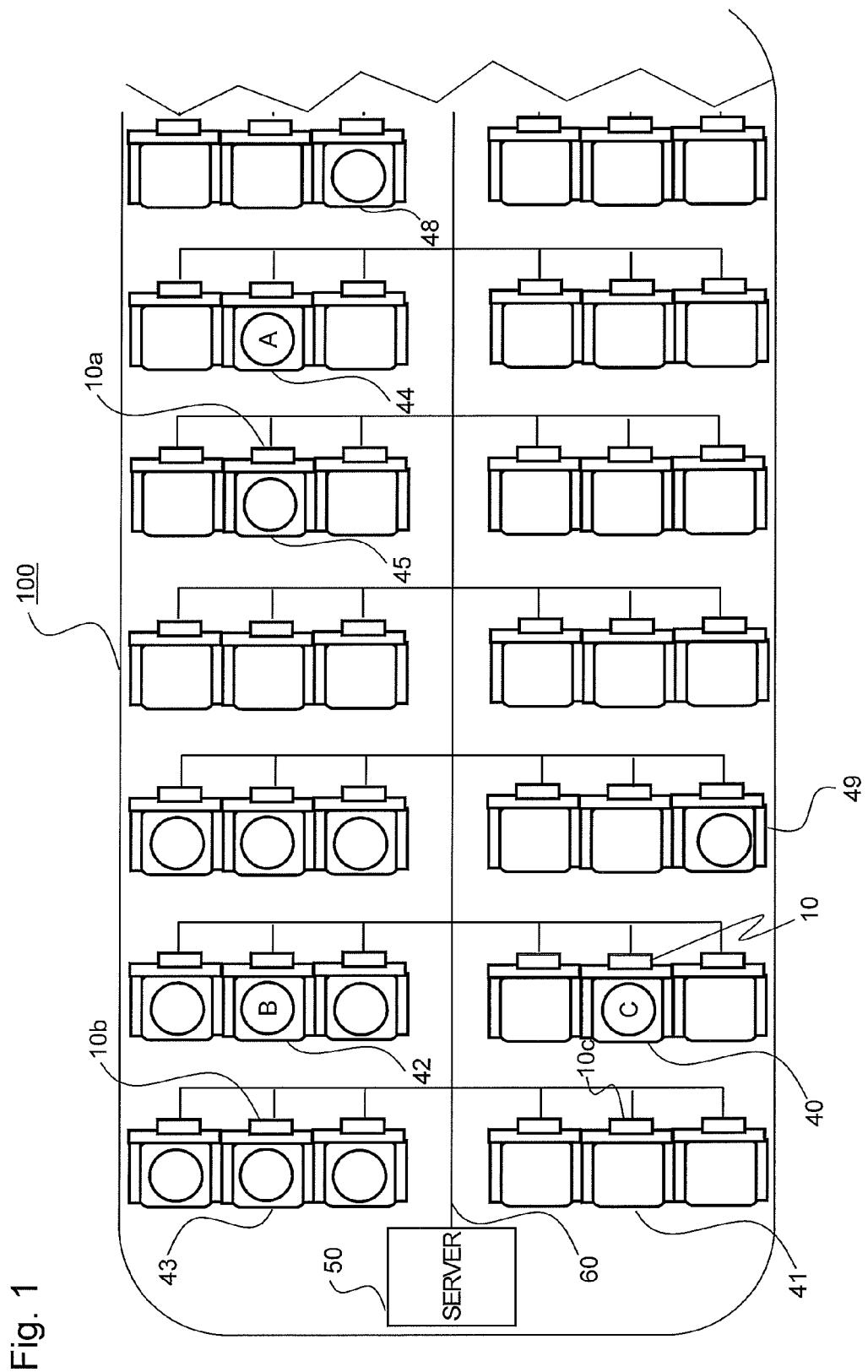
FIG. 1 is a schematic diagram showing an example of arrangement of electronic devices in an information providing system of Embodiment 1.

FIG. 1 is a schematic diagram showing an example of arrangement of the electronic devices 10 in the information providing system of the present embodiment. FIG. 1 is a plan view of arrangement of seats in the aircraft 100, which is a movable carrier. FIG. 2 is a side view of each seat shown in FIG. 1. FIG. 2 shows a seat 40 where a person C shown in FIG. 1 is seated, and a seat 41 in front of the seat 40.

As shown in FIG. 1, typically in the aircraft 100, a plurality of seats are arranged in a grid shape. That is, in the aircraft 100, seats are arranged in a plurality of lines extending in the front-rear direction, and in a plurality of rows extending in the left-right direction. Each seat is provided with the electronic device 10 which functions as a seat monitor and the like. As shown in FIG. 2, the electronic device 10 is installed in a backrest 46 of each seat. A seat immediately behind the seat having the electronic device 10 installed in its backrest 46 is a user seat where the operator of the electronic device 10 sits. Each electronic device 10 is connected, through a network 60, to a server 50 (host computer) installed in the aircraft 100. The server 50 has accumulated therein, for example, seat information (overall seat information) indicating a booking state of seats (all passenger seats) of the aircraft 100 and video/ audio content data, and distributes necessary data to each electronic device 10. Further, the electronic devices 10 can communicate with each other through the network 60.

Figure 2:
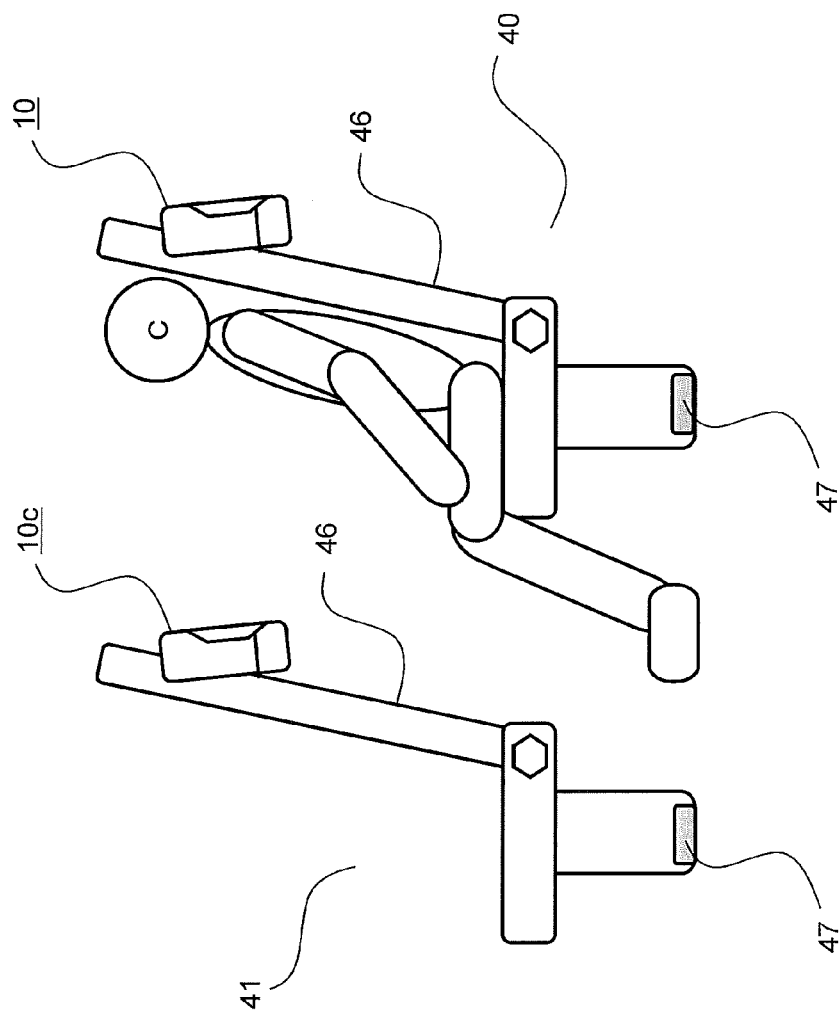

As shown in FIG. 2, a person C present in the seat 40 uses an electronic device 10c mounted to the seat 41 in front of himself or herself. Further, in the present embodiment, each seat is provided with a weight sensor 47 as a person detection sensor for detecting whether a person is seated on the seat. The weight sensor 47 is arranged at the bottom portion of the seat. The weight sensor 47 of the seat 40 where the operator of the electronic device 10c sits detects the weight applied on the seat 40, and transmits the result, as a detection result, to the electronic device 10c mounted to the seat 41 in front of the seat 40. The electronic device 10c determines whether a person is seated on the seat 40, which is the user seat for the electronic device 10c, based on the detection result (such as a value measured by the weight sensor) transmitted from the weight sensor 47. It should be noted that the weight sensor 47 transmits the detection result to the electronic device 10c through, for example, the network 60 or wireless communication.

<Overall Configuration of Electronic Device>

Next, a configuration of the electronic device 10 will be described with reference to FIGS. 3 to 6.

Figure 3:
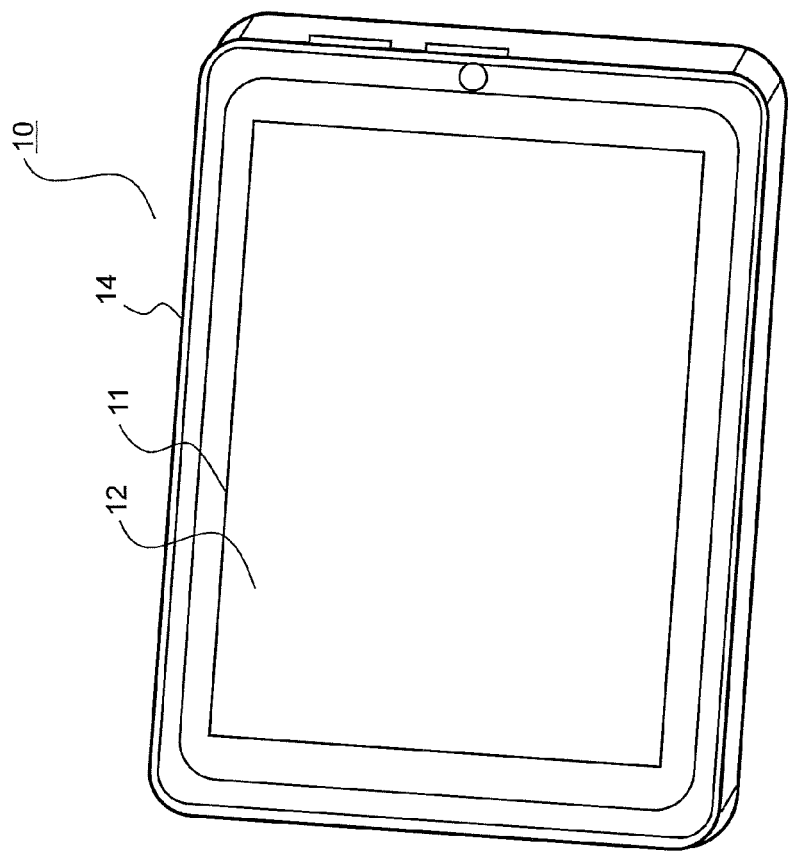
FIG. 3 is an external perspective view of an electronic device of Embodiment 1.
Figure 4:
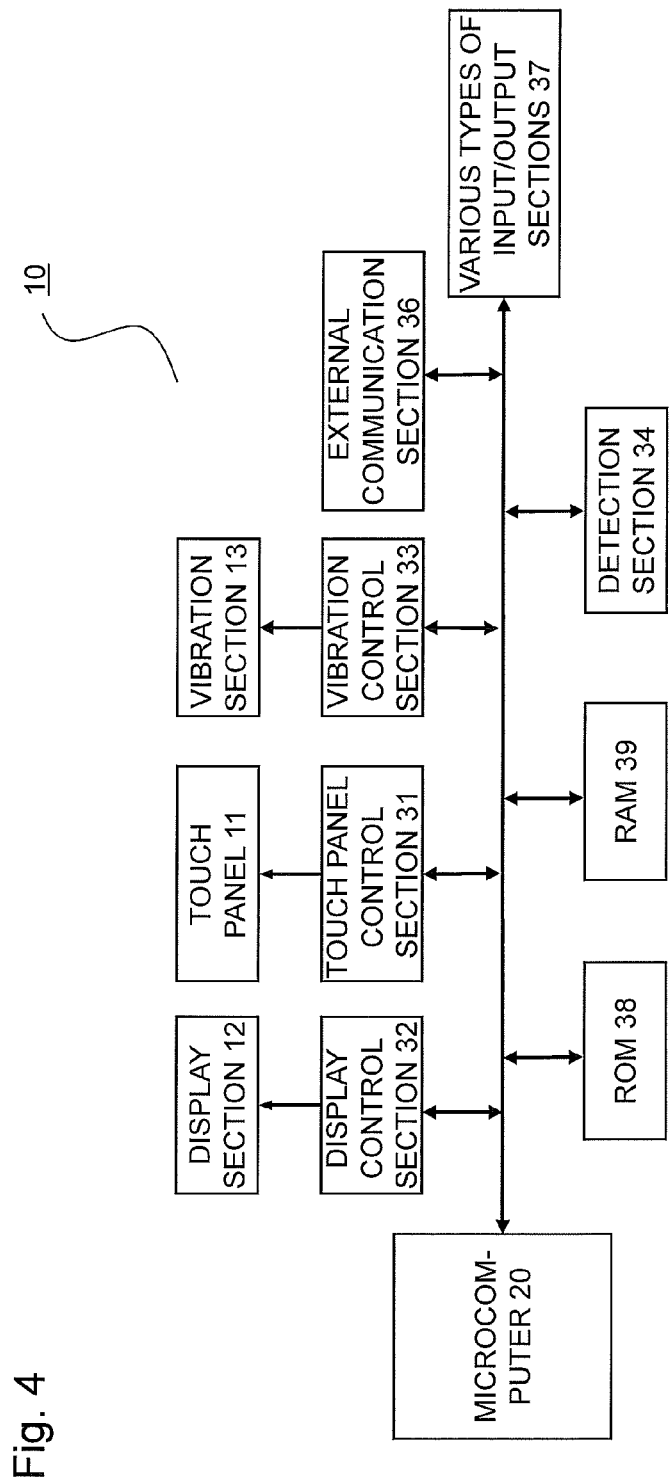
FIG. 4 is a block diagram schematically illustrating a configuration of the electronic device of Embodiment 1.

FIG. 3 is an external perspective view of the electronic device 10 according to the present embodiment. FIG. 4 is a block diagram showing a configuration of the electronic device 10 according to the present embodiment.

As shown in FIG. 3 and FIG. 4, the electronic device 10 is composed mainly of a touch panel 11, a display section 12, the vibration section 13, a vibration control section 33, and a microcomputer 20, which are housed in a housing 14. The touch panel 11 is provided on the display surface side of the display section 12, and covers at least a part of the display section 12. The vibration section 13 vibrates the touch panel 11. The vibration control section 33 performs control of the vibration section 13 to control a vibration state (such as amplitude, frequency, and waveform) of the vibration section 13. The user operates the electronic device 10 by performing a touch operation of touching the touch panel 11, using a finger or a pen, regarding the contents displayed on the display section 12. In FIG. 4, the electronic device 10 also includes a touch panel control section 31, a display control section 32, a detection section 34, an external communication section 36, an input/output section 37, a ROM 38, and RAM 39.

<Description of Individual Configuration>

The display section 12 displays characters, numerals, figures, a keyboard, and the like. The display section 12 includes an operation area (not shown) in which the user can perform a touch operation. In the operation area, for example, an image, such as a keyboard, for receiving an input from the user is displayed. For example, the user can input a character, by performing a touch operation at a desired position on the keyboard displayed on the display section 12. As the display section 12, for example, a known display device such as a liquid crystal display, an organic EL (Electro Luminescence) display, an electronic paper, or a plasma display can be used. The display control section 32 controls the display content of the display section 12, based on a control signal generated by the microcomputer 20.

The touch panel 11 is arranged on the display section 12 so as to cover at least the operation area. By performing a touch operation with a finger or a pen on the touch panel 11, the user can operate the electronic device 10. The touch panel 11 can detect the position touched by the user. Information of the position touched by the user is transmitted to the microcomputer 20 via the touch panel control section 31. The microcomputer 20 performs various processes described later, using the information of the position touched by the user. As the touch panel 11, for example, a touch panel of a capacitance type, resistive film type, optical type, ultrasonic wave type, electromagnetic type, or pressure-sensitive type can be used.

The vibration section 13 vibrates the touch panel 11. The vibration control section 33 controls vibrate patterns for the vibration section 13. When the microcomputer 20 has detected a touch operation performed by the user through information from the touch panel control section 31, the microcomputer 20 controls the vibration control section 33 to cause the vibration section 13 to vibrate, thereby vibrating the touch panel 11. Vibration of the touch panel 11 makes the user confirm, through sense of touch, that he or she has performed the touch operation.

Further, the microcomputer 20 controls the vibration control section 33, in accordance with an image at the position touched by the user within a display area of the display section 12. For example, in the case where a position where a button is displayed is touched, the microcomputer 20 calls, from the ROM 38 or the RAM 39, data of a vibration waveform that would give the user a tactile sense of pressing the button, and then transfers the data of that vibration waveform to the vibration control section 33. Based on the data of the vibration waveform received from the microcomputer 20, the vibration control section 33 controls the vibration section 13. As a result, by providing the touch panel 11 with a vibration represented by the data of the vibration waveform, the vibration section 13 reproduces a tactile sense of pressing the button on the touch panel 11 through the vibration.

Further, by controlling the vibration waveform for the vibration section 13 in accordance with the luminance distribution of an image followed by the user with a finger or a pen within the display area of the display section 12, the microcomputer 20 can also reproduce, on the touch panel 11, a feel of unevenness or roughness in accordance with the image. The electronic device 10 also allows the user to adjust the magnitude of the amplitude of the vibration of the vibration section 13 (intensity of vibration of the touch panel 11). With the electronic device 10, when the user operates a physical button or lever provided on the body of the electronic device 10, or performs an operation onto a menu displayed on the electronic device 10, the user can adjust the magnitude of the amplitude of the vibration of the vibration section 13. Further, in the electronic device 10, there is set an upper limit of the amplitude of the vibration of the vibration section 13. Therefore, even in the case where the user tries to increase the amplitude of the vibration of the vibration section 13, if the tried amplitude exceeds the set upper limit of the amplitude of the vibration, the amplitude is fixed to the upper limit value.

The detection section 34 detects whether a person is present on the user seat. In the present embodiment, the weight sensor 47 is arranged below the user seat. Accordingly, whether a person is on the user seat is determined, based on the difference between the weight when a person is seated on the seat and the weight when no person is seated on the seat. The microcomputer 20 can determine whether a person is present on the user seat, by making an inquiry with the detection section 34. It should be noted that every time the detection section 34 detects a change in the weight, the detection section 34 may notify the microcomputer 20 of the change. The weight sensor is preferably arranged at a lower part of the place where the operator sits, but may be arranged in the backrest of the seat or below the whole seat.

It should be noted that the person detection sensor used when determining whether a person is present on the user seat is not limited to a weight sensor. For example, whether a person is present on the user seat may be determined by means of an image taken by a camera mounted to the seat in front of the user seat, the electronic device, or the like. Alternatively, whether a person is present on the user seat may be determined by a sensor that measures the temperature, such as an infrared sensor. Such an infrared sensor may be mounted, for example, to the seat in front of the user seat, the electronic device, or the like. Further, whether a person is present on the user seat may be determined based on a wearing state of a seat belt of the user seat.

Further, the detection section 34 can also determine whether persons are seated on seats near the user seat, by confirming seat information which indicates a booking state of seats of the aircraft 100 of the day and which is received from the server 50 via the external communication section 36. That is, the detection section 34 detects, as detection information, an existence state of persons who are other than the operator of the electronic device 10 and are near to the electronic device 10, based on the seat information. Based on the detection information obtained from the detection section 34, the microcomputer 20 determines whether there is a person other than the operator near (around) the electronic device 10, and controls the vibration control section 33. Specifically, when the degree of crowding of persons other than the operator and being near to the electronic device 10 is high, the microcomputer 20 decreases the upper limit value of the amplitude of the vibration, and when the degree of crowding of persons other than the operator and being near to the electronic device 10 is low, the microcomputer 20 increases the upper limit value of the amplitude of the vibration.

Further, the electronic device 10 includes various types of input/output sections 37 that can receive/output data from/to various types of electronic devices. The external communication section 36 is a communication section that performs, for example, communication with the server 50 and communication with other electronic devices.

<Description of Arrangement of Components>

Figure 5:
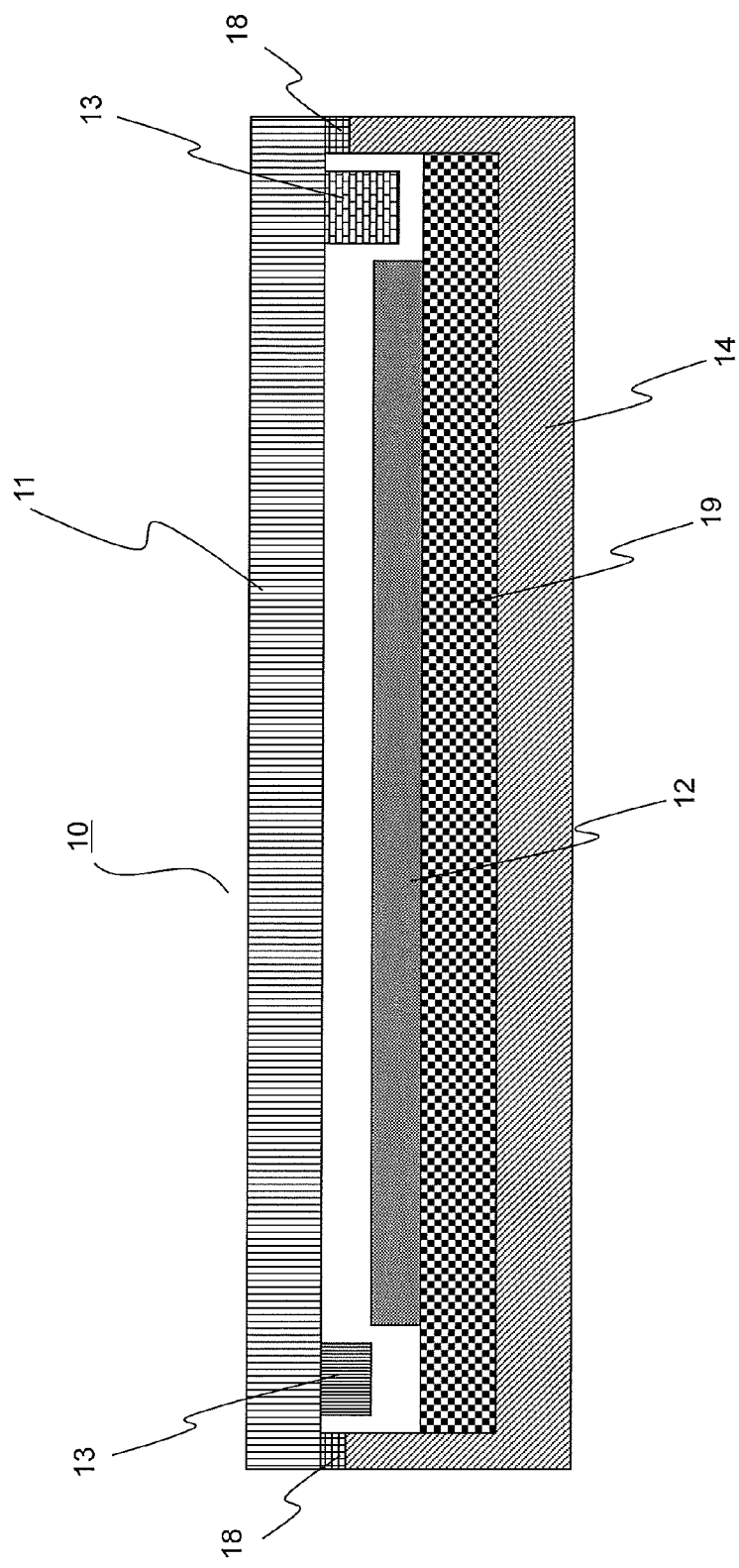
FIG. 5 is a cross-sectional view of the electronic device of Embodiment 1.

FIG. 5 is a cross-sectional view of the electronic device 10. As shown in FIG. 5, with respect to the electronic device 10 of the present embodiment, the touch panel 11, the display section 12, the vibration sections 13, and a circuit board 19 are housed in the housing 14. The microcomputer 20, the RAM 39, the ROM 38, various types of control sections, the detection section 34, a power source, and the like are arranged on the circuit board 19.

Each vibration section 13 is installed in the touch panel 11, and can provide the user with a sense of touch by vibrating the touch panel 11. The touch panel 11 is mounted on the housing 14 via spacers 18. Each spacer 18 suppresses vibration of the touch panel 11 from being conveyed to the housing 14. The spacer 18 is, for example, a buffer member such as silicone rubber or urethane rubber.

The display section 12 is arranged in the housing 14, and the touch panel 11 is arranged so as to cover the display section 12. The touch panel 11, the vibration sections 13, and the display section 12 are each electrically connected to the circuit board 19.

<Configuration of Vibration Section>

Figure 6:
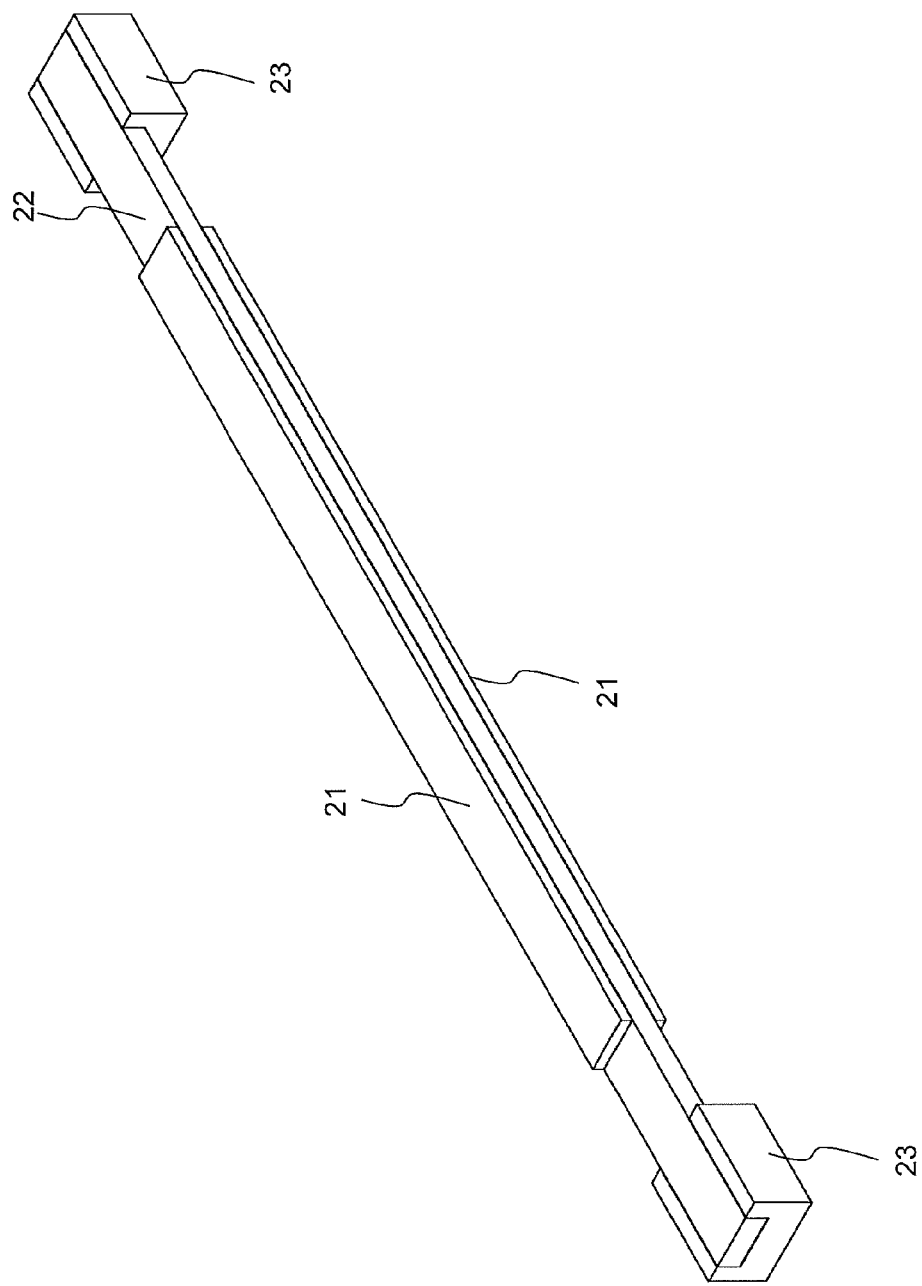
FIG. 6 is an external perspective view of a vibration section of Embodiment 1.

A configuration of each vibration section 13 will be described with reference to FIG. 6. FIG. 6 is an external perspective view of the vibration section 13 of the present embodiment. As shown in FIG. 6, the vibration section 13 includes piezoelectric elements 21, a shim plate 22, and bases 23. The piezoelectric elements 21 are respectively bonded to the faces of the shim plate 22 having an elongated thin plate shape. Both ends of the shim plate 22 are connected to the bases 23, respectively, and the vibration section 13 is so-called supported at both ends. Each base 23 is connected to the touch panel 11.

The piezoelectric element 21 is formed of piezoceramics such as lead zirconate titanate or a piezoelectric single crystal such as lithium niobate. During vibration of the vibration section 13, the piezoelectric element 21 expands and contracts under voltage from the vibration control section 33. During vibration of the vibration section 13, the vibration control section 33 controls the piezoelectric elements 21 such that one of the pair of the piezoelectric elements 21 attached to the respective faces of the shim plate 22 expands, and at the same time, the other of the piezoelectric elements contracts, thereby causing flexural vibration in the shim plate 22.

The shim plate 22 is a spring member such as phosphor bronze. Vibration of the shim plate 22 vibrates the touch panel 11, via the bases 23. As a result, the user performing a touch operation on the touch panel 11 can sense vibration of the touch panel 11.

Each base 23 is a metal such as aluminum or brass, or a plastic such as PET or PP.

The frequency, amplitude, and duration of the vibration of the vibration section 13 (vibration of the shim plate 22) are controlled by the vibration control section 33. It should be noted that the frequency of the vibration of the vibration section 13 is preferably about 100 to 400 Hz.

In the present embodiment, the piezoelectric elements 21 are attached to the shim plate 22, whose vibration causes the touch panel 11 to vibrate. However, the piezoelectric elements 21 may be directly attached to the touch panel 11, and expansion and contraction (vibration in the longitudinal direction) of the piezoelectric elements 21 may cause the touch panel 11 to vibrate. Further, in the case where a cover member or the like is provided on the touch panel 11, the piezoelectric elements 21 may be attached to the cover member to expand and contract thereon, to cause the cover member to vibrate, whereby the touch panel 11 may be caused to vibrate. Further, as a vibration source for the vibration section 13, a vibration motor may be used instead of the piezoelectric elements 21.

[1-2. Operation]

Operations of the electronic device 10 configured as above will be described with reference to FIG. 2 and FIG. 7 to FIG. 9.

Figure 7:
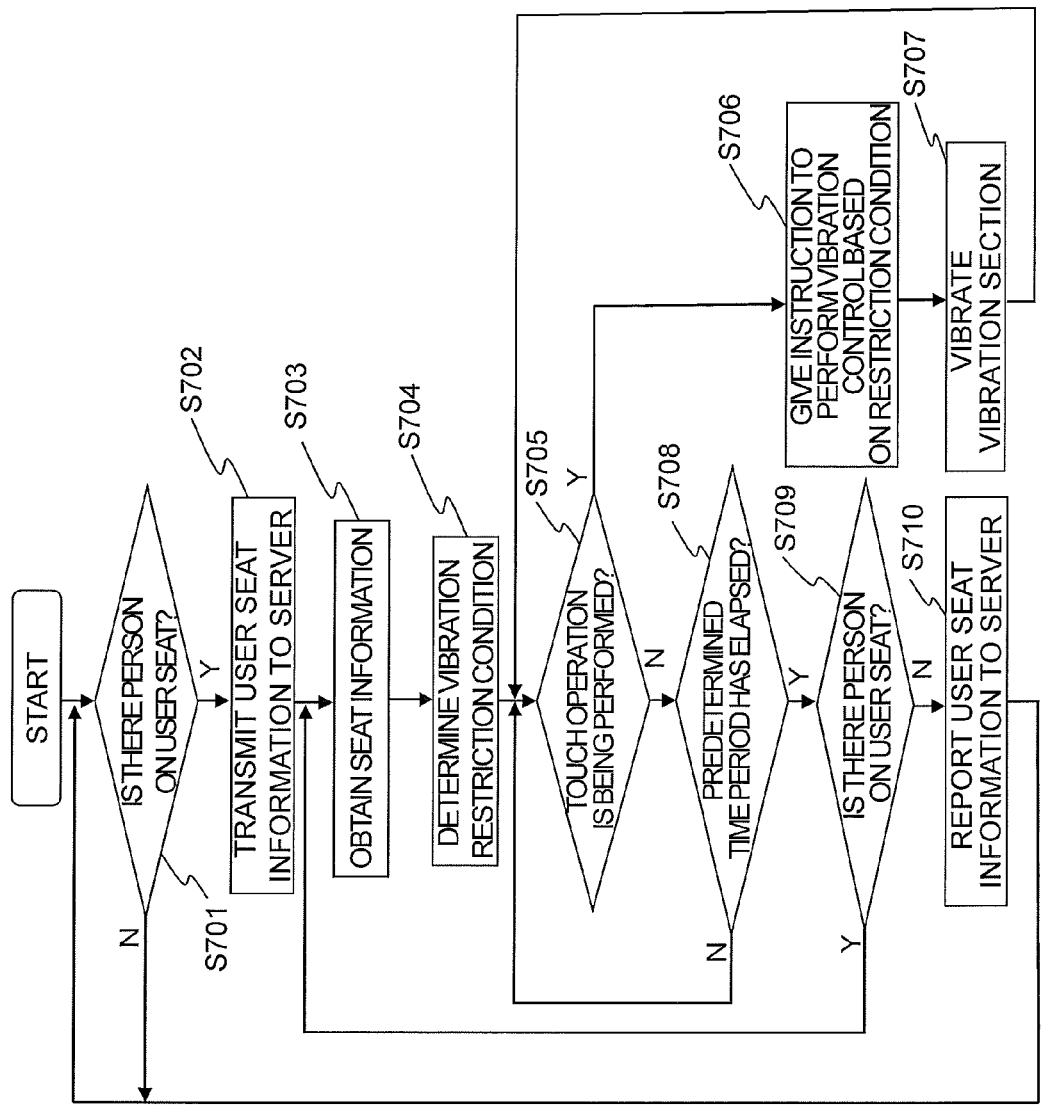
FIG. 7 is a flow chart for describing operations performed by the electronic device of Embodiment 1.

FIG. 7 is a flow chart describing operations performed by the electronic device 10. Hereinafter, using the electronic device 10c arranged at the backrest 46 of the seat 41 in FIG. 2 (the electronic device 10c for the seat 40) as an example, operations performed by the electronic device 10 will be described.

First, the microcomputer 20 makes an inquiry with the detection section 34 and confirms whether a person is seated on the seat 40 (user seat) for the operator of the electronic device 10c (step S701). Step S701 is periodically performed. When having confirmed that a person is seated on the seat 40, the microcomputer 20 transmits user seat information indicating that a person is seated on the seat 40 to the server 50 via the external communication section 36 (step S702).

Next, in step S703, the microcomputer 20 instructs the detection section 34 to make an inquiry about seat information (overall seat information) including information indicating whether seats near (around) the seat 40 of the aircraft 100 are booked. Upon receiving the instruction from the microcomputer 20, the detection section 34 makes an inquiry with the server 50 about the seat information. Here, having received the inquiry about the seat information, the server 50 distributes the seat information to the electronic device 10. Then, based on the seat information distributed by the server 50, the detection section 34 detects, as detection information, an existence state of persons other than the operator of the electronic device 10 and being near to the electronic device 10, and outputs the detection information to the microcomputer 20. The detection information is information indicating whether persons are present on target seats near the user seat. The microcomputer 20 obtains the detection information, and step S703 ends.

It should be noted that the server 50 may extract seat information of the seats near the user seat from the overall seat information that the server 50 manages itself, and may distribute the extracted seat information to the electronic device 10. Further, the detection section 34 may be provided in the server 50, not in the electronic device 10, and the microcomputer 20 may obtain detection information from the server 50. In this case, the server 50 may determine a restriction condition described later and transmit it to the electronic device 10.

Based on the detection information obtained from the detection section 34 in step S703, the microcomputer 20 determines a restriction condition (vibration manner) that restricts a vibration state of the vibration section 13, from a control table described later (step S704). The restriction condition is an upper limit value of the amplitude for the vibration section 13. A method for determining a restriction condition will be described later. It should be noted that, as a restriction condition, factors that are related to vibration such as frequency or waveform may be used, other than amplitude. Further, a plurality of vibration factors selected from amplitude, frequency, and waveform, may be used in combination as the restriction condition.

The microcomputer 20 determines whether a touch operation onto the touch panel 11 is being performed by the user (step S705). When having determined that the user is performing a touch operation onto the touch panel 11, the microcomputer 20 instructs the vibration control section 33 to perform a vibration control to vibrate the vibration section 13 so as to satisfy the restriction condition determined in step S704 (step S706). The vibration control section 33 performs the vibration control to vibrate the vibration section 13 based on the restriction condition as instructed by the microcomputer 20 (step S707).

When having determined that the user is not performing a touch operation in step S705, the microcomputer 20 checks whether a predetermined time period has elapsed (step S708).

When having determined that the predetermined time period has not elapsed, the microcomputer 20 returns to step S705. When having determined that the predetermined time period has elapsed, the microcomputer 20 determines whether a person is present on the seat 40 (user seat) (step S709). When having determined that there is no person on the seat 40 in step S709, the microcomputer 20 reports, to the server 50, user seat information indicating that there is no person seated on the seat 40 (step S710). After step S710 has ended, the microcomputer 20 returns to step S701. When having determined that a person is present on the seat 40 in step S709, the microcomputer 20 returns to step S703.

Figure 8:
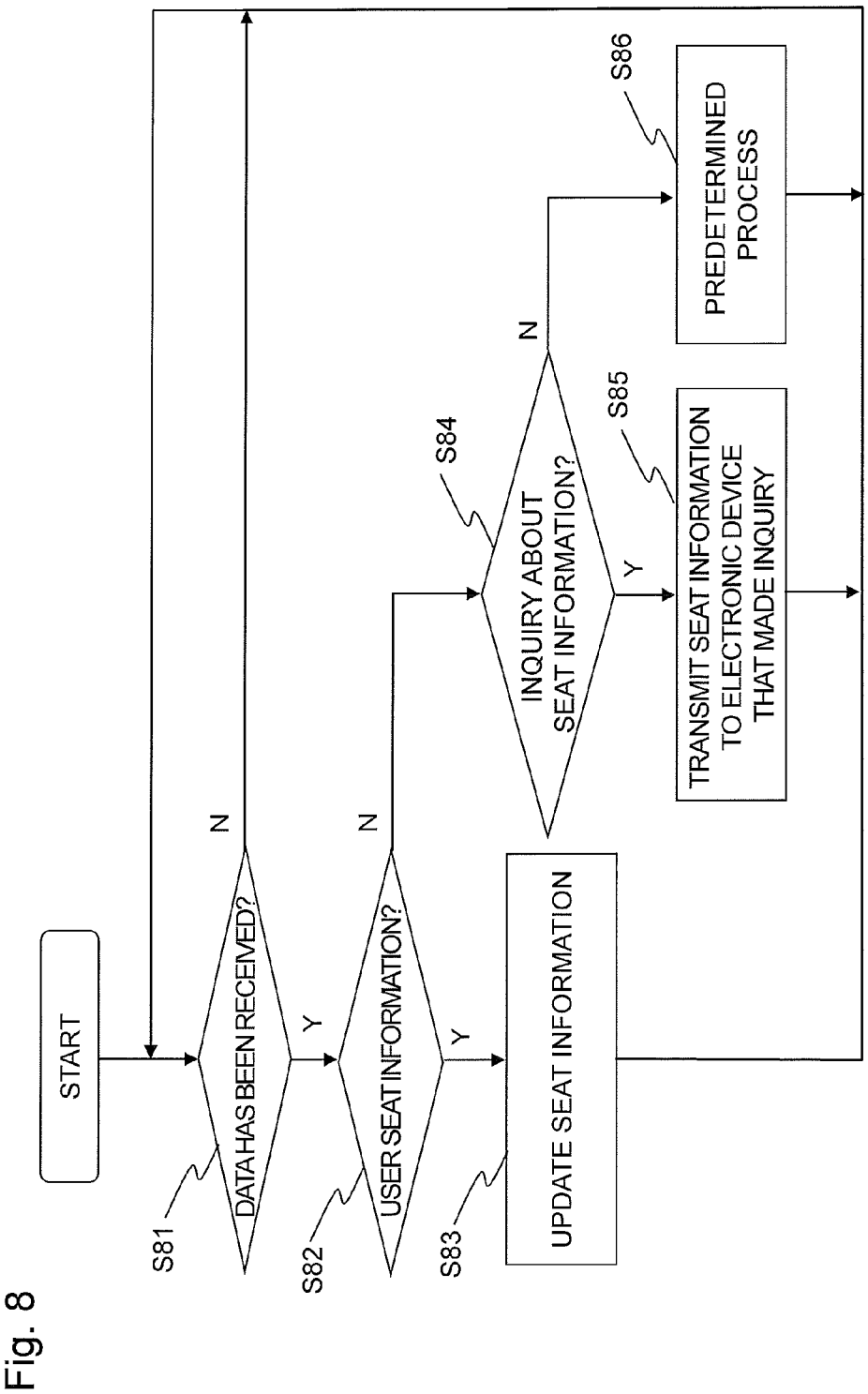
FIG. 8 is a flow chart for describing operations performed by a server of Embodiment 1.

FIG. 8 is a flow chart for describing operations performed by the server 50.

The server 50 determines whether data from the electronic device 10 being a client has been received in step S81, and repeats step S81 until it determines that data has been received. When having determined that data from the electronic device 10 has been received, the server 50 determines whether the received data is user seat information (step S82). It should be noted that, as shown in FIG. 7, the electronic device 10 transmits user seat information to the server 50 only when the state of the user seat has changed between a state where a person is present and a state where no person is present. When having determined that the user seat information has been received, the server 50 updates seat information stored in itself, to the new seat information, based on the received user seat information (step S83). When step S83 ends, the server 50 returns to step S81.

When having determined that the data received in step S82 is not user seat information, the server 50 determines whether the received data is an inquiry about seat information (step S84). When having determined that the received data is an inquiry about seat information, the server 50 transmits seat information (latest seat information) stored in the server 50 to the electronic device 10 which has made the inquiry about seat information (step S85). When step S85 ends, the server 50 returns to step S81.

When having determined that the received data in step S84 is not an inquiry about seat information, the server 50 performs a predetermined process corresponding to the received data in step S86, and then returns to step S81. It should be noted that as initial seat information, booking information of the aircraft 100 is used.

<Method for Determining Restriction Condition>

FIG. 9 shows an example of a control table (vibration manner table) for the vibration section 13. As shown in FIG. 9, the control table includes degree of crowding near (around) the user seat, and vibration restriction condition (vibration manner). In the present embodiment, eight seats surrounding (i.e., immediately to the front, rear, left, right, diagonally front left and right, and diagonally back left and right of) the user seat are defined as target seats. Then, depending on how many persons are seated in the eight target seats, and depending on at which positions relative to the user seat persons are seated, the degree of crowding near the user seat is ranked into "high", "medium", and "low". In the present embodiment, the degree of crowding "low" is a state where persons are scarcely seated on the target seats (e.g., the number of target seats where persons are seated is not greater than 2), and where no persons are seated on any of the target seat immediately in front of the user seat and the target seats immediately to the left and right of the operator. The degree of crowding "medium" is a state where the number of target seats where persons are seated is not greater than 5, and where at least one person is seated on any of the target seat immediately in front of the user seat or the target seats immediately to the left and right of the operator; or a state where the number of target seats where persons are seated is not smaller than 3 but not greater than 5, and where no persons are seated in any of the target seat immediately in front of the user seat and the target seats immediately to the left and right of the operator. The degree of crowding "high" is a state where persons are seated on most of the target seats (e.g., the number of the target seats where persons are seated is not smaller than 6). This state means that a person is seated on at least one of the target seat immediately in front of the user seat or the target seats immediately to the left and right of the operator.

In the present embodiment, the target seats only include seats immediately to the front, rear, left, right, diagonally front left and right, and diagonally back left and right of the user seat. However, the target seats are not limited to those. The range of target seats may be determined based on the magnitude of vibration generated by the vibration section 13. For example, in addition to the seats adjacent to the user seat, seats adjacent to those seats may be used as target seats.

In the present embodiment, as a vibration restriction condition, an upper limit value (hereinafter, referred to as "upper limit vibration") for the amplitude of the vibration of the vibration section 13 (the shim plate 22) is set. In the case where the degree of crowding is "high", since many persons are present around the electronic device 10, the upper limit vibration is set to 5 μm such that vibration noise does not bother the surrounding persons. In the case where the degree of crowding is "medium", the upper limit vibration is set to 10 μm, which is greater than that when the degree of crowding is "high". When the degree of crowding is "low", the upper limit vibration is set to 20 μm, which is greater than that when the degree of crowding is "medium". This is because even when the amplitude of the vibration of the vibration section 13 is increased to some extent, the noise will not bother the surrounding persons.

It should be noted that FIG. 9 is merely an example, and the number of ranks of the degree of crowding may be greater than 3, or smaller than 3. Further, the upper limit vibration may be set to 0 μm. That is, for example, when the degree of crowding is "high", vibration of the vibration section 13 corresponding to a touch operation may be prevented.

Hereinafter, specific operations in the present embodiment will be described with reference to a seat arrangement diagram in the aircraft 100 shown in FIG. 1.

In FIG. 1, reference characters A, B, and C denote operators seated on the seats 40, 42, and 44, and electronic devices 10a, 10b, and 10c denote electronic devices used by the operators A, B, and C.

First, operations performed by the electronic device 10a (the electronic device 10a for the operator A) mounted to a seat 45 will be described. As a result of determining whether there is a person on a seat 44 (user seat), the electronic device 10a determines that a person (the operator A) is present on the seat 44, and reports, to the server 50, user seat information indicating that there is a person seated on the seat 44. Next, the electronic device 10a determines whether the power source of the touch panel 11 is in an ON state. When the power source of the touch panel 11 is in the ON state, the electronic device 10a obtains latest seat information from the server 50. The electronic device 10a determines the degree of crowding near the seat 44, based on the obtained seat information. In this case, near the seat 44, persons are seated on the seat 45 to which the electronic device 10a is mounted and on a seat 48 to the diagonally back left of the seat 44. Accordingly, the electronic device 10a determines the degree of crowding is "medium". The electronic device 10a obtains the vibration restriction condition for the degree of crowding "medium", from the control table shown in FIG. 9, and sets the upper limit vibration to 10 μm to vibrate the touch panel 11.

Next, operations performed by the electronic device 10b (for the operator B) mounted to a seat 43 will be described. As a result of determining whether there is a person on a seat 42 (user seat), the electronic device 10b determines that there is a person (the operator B) seated on the seat 42, and reports, to the server 50, user seat information indicating that a person is present on the seat 42. Next, the electronic device 10b determines whether the power source of the touch panel 11 is in the ON state. When the power source of the touch panel 11 is on the ON state, the electronic device 10b obtains latest seat information from the server 50. The electronic device 10b determines the degree of crowding near the seat 42, based on the obtained seat information. In this case, persons are seated on all of the target seats near the seat 42. Accordingly, the electronic device 10b determines that the degree of crowding is "high". The electronic device 10b obtains the vibration restriction condition for the degree of crowding "high", from the control table shown in FIG. 9, and sets the upper limit vibration to 5 μm to vibrate the touch panel 11.

Next, operations performed by the electronic device 10c (for the operator C) mounted to the seat 41 will be described. As a result of determining whether there is a person on the seat 40 (user seat), the electronic device 10c determines that a person (the operator C) is present on the seat, and reports, to the server 50, user seat information indicating that there is a person seated on the seat 40. Next, the electronic device 10c determines whether the power source of the touch panel 11 is in the ON state. When the power source of the touch panel 11 is in the ON state, the electronic device 10c obtains latest seat information from the server 50. The electronic device 10c determines the degree of crowding near the seat 40, based on the obtained seat information. In this case, a person is seated only on a seat 49 which is to the diagonally back left of the seat 40. Accordingly, the electronic device 10c determines that the degree of crowding is "low". The electronic device 10c obtains the vibration restriction condition for the degree of crowding "low", from the control table shown in FIG. 9, and sets the upper limit vibration to 20 μm to vibrate the touch panel 11.

[1-3. Summary]

As described above, the electronic device 10 of the present embodiment includes the touch panel 11, the vibration section 13 which vibrates the touch panel 11, and control sections 20 and 33 which control the vibration section 13 based on an existence state of persons other than the operator of the electronic device 10 and being near to the electronic device 10 (within a predetermined range of the electronic device 10).

Accordingly, the control sections 20 and 33 can control the intensity of vibration of the touch panel 11, based on information (that is, information indicating an ambient environment of the electronic device 10) indicating an existence state of persons, detected by the detection section 34, other than the operator of the electronic device 10 and being near to the electronic device 10. This can make it difficult for persons other than the operator of the electronic device 10 to sense vibration generated by the vibration section 13. Thus, the operator can be provided with an environment in which the operator can comfortably operate the electronic device 10, without bothering surrounding persons.

Further, the electronic device 10 of the present embodiment includes the external communication section 36 which communicates with an external device, and the detection section 34 which detects an existence state of persons other than the operator of the electronic device 10 and being near to the electronic device 10, based on the seat information (external information) obtained through the external communication section 36. Accordingly, without providing a sensor which detects persons in the electronic device 10 itself, the vibration section 13 can be appropriately controlled.

Further, in the electronic device 10 of the present embodiment, the microcomputer 20 determines a restriction condition that restricts a vibration state of the vibration section 13 based on an existence state of persons other than the operator of the electronic device 10 and being near to the electronic device 10, and controls the vibration section 13 so as to satisfy the restriction condition, through the vibration control section 33. The microcomputer 20 determines an upper limit vibration (upper limit value of the amplitude) for the vibration section 13 as the restriction condition, thereby restricting the amplitude for the vibration section 13 so as not to be greater than the upper limit vibration. Accordingly, even when the user adjusts the amplitude of the vibration of the vibration section 13 to a higher value, the vibration of the vibration section 13 can be controlled so as to have an amplitude not greater than the upper limit vibration.

Further, the electronic device 10 of the present embodiment is used in an environment where t a plurality of seats are provided, and the detection section 34 obtains, as external information, seat information indicating whether there are persons respectively seated on the plurality of target seats (such as seats adjacent to the user seat). The seat information is obtained from the server 50. The detection section 34 of the electronic device 10 detects an existence state of persons other than the operator of the electronic device 10 and being near to the electronic device 10 itself, based on the seat information obtained through the external communication section 36. Accordingly, by effectively using seat information (such as seat booking state) comprehensively managed by the server 50, the detection section 34 can detect an existence state of persons other than the operator of each electronic device 10 and being near to the electronic device 10.

Further, the microcomputer 20 controls the vibration section 13, based on both information of the number of persons indicating the number of target seats where persons are seated, and position information indicating positions of target seats, relative to the user seat, where persons are seated. Each of the information of the number of persons and the position information indicates an existence state of persons other than the operator of the electronic device 10 and being near to the electronic device 10. The microcomputer 20 controls the vibration section 13 so as to satisfy the restriction condition determined based on the information of the number of persons and the position information. It should be noted that, the microcomputer 20 may control the vibration section 13, based on at least one of the information of the number of persons and the position information. Further, the server 50 may determine one of a plurality of electronic devices as a target device, and may detect, as detection information, an existence state (at least one of the information of the number of persons and the position information) of persons other than the operator of that target device and being in that target device, to transmit that detection information to the target device. Further, instead of transmitting the detection information to a target device, the server 50 may determine a restriction condition for the vibration section 13 of the target device based on the detection information, and transmit the determined restriction condition to the target device corresponding to that restriction condition.

[Modification 1 of Embodiment]

In Modification 1, the degree of crowding near the user seat is determined based only on the total number of persons seated on the eight target seats surrounding the user seat. In this case, the microcomputer 20 makes determination such that the greater the total number of persons seated on the target seats is, the greater the degree of crowding near the user seat is. Further, the microcomputer 20 sets an upper limit vibration such that the greater the degree of crowding is, the smaller the upper limit vibration value is.

[Modification 2 of Embodiment]

In Modification 2 which is based on Modification 1 above, the degree of crowding near the user seat is determined, further using information indicating the position (of each target seat where a person is seated) of each target seat relative to the user seat. For example, points are allocated to each target seat, and only when a person is present on a target seat, some points are added. Then, the degree of crowding is determined by the total of these points. In such a case, more points are allocated to the target seat immediately in front of the user seat and the target seats immediately to the left and right of the user seat, than to the other target seats. Accordingly, when a person is present on a seat to which vibration generated by the vibration section 13 is easily conveyed, the upper limit vibration can be preferentially suppressed.

[Modification 3 of Embodiment]

In Modification 3, the vibration section is controlled, by using only information of each target seat (target seat where a person is seated) that has specific positional relationship with the user seat. For example, only when a determination criterion is satisfied that a person is present on at least one of the target seat immediately in front of the user seat or the target seats immediately to the left and right of the user seat, the microcomputer 20 instructs the vibration control section 33 to prevent vibration of the vibration section 13 even if a touch operation is performed.

It should be noted that only when the above determination criterion is satisfied, the microcomputer 20 may instruct the vibration control section 33 to decrease the upper limit vibration compared to that when the determination criterion is not satisfied.

Modification 3 uses information that indicates the position, relative to the user seat, of each target seat where a person is seated. Accordingly, in the case where the degree of crowding near the user seat is low but a person is present on a seat (seat to which vibration is relatively easily conveyed among the target seats) that has a specific positional relationship with the user seat, the operator can be provided with an environment in which the operator can comfortably operate the electronic device 10 without bothering that person.

(Other Embodiments)

As presented above, Embodiment 1 has been described as an example of the technology according to the disclosure of the present application. However, the technology in the present disclosure is not limited thereto, and can be applied to embodiments where modifications, replacements, additions, and omissions are made as appropriate. Further, a new embodiment can be made in combination of various components described in the above embodiment.

Now, other embodiments will be described as examples.

In Embodiment 1, as an example of the control section (controller), the microcomputer 20 has been described. The control section may have any physical configuration as long as it controls the electronic device. Therefore, the control section is not limited to the microcomputer 20. However, when the microcomputer 20 which is programmable is used, processing contents can be changed by changing the program, which can increase the degree of freedom for designing the control section. Further, the control section may be realized through a hard logic. Realization of the control section through a hard logic is effective for increasing the processing speed. The control section may be composed of one element or a plurality of physically different elements. When the control section is composed of a plurality of elements, respective controls described in claims may be realized by different elements. In this case, those elements can be considered as forming one control section. Further, the control section and a member having a function different from that of the control section may be realized by one element.

Further, in Embodiment 1, the detection section 34 detects an existence state of persons other than the operator (hereinafter referred to as "detection target person") and being near to the electronic device, by using the seat information. However, the present disclosure is not limited thereto as long as the existence state of detection target persons can be determined. For example, information of whether detection target persons are using a headphone may be used in addition to the seat information. For example, the vibration section may be controlled based on an existence state of persons other than the operator of the electronic device and being near to the electronic device, excluding the persons using a headphone. A person using a headphone exhibits higher tolerance for sound than a person not using a headphone. Therefore, use of information of whether a detection target person is using a headphone is effective.

Further, Embodiment 1, the vibration restriction condition is determined by using person presence information regarding seats near the operator. However, the present disclosure is not limited thereto. For example, the restriction condition may be determined also in consideration of time information, in addition to the person presence information. The reason for this is as follows. Even if the degree of crowding is the same, immediately after departure of a movable carrier (e.g., aircraft) when many passengers are awake, a person exhibits higher tolerance for sound from surrounding persons, because there are conversations between passengers and the like. Thus, immediately after the departure, the upper limit vibration may be increased. However, at late night or when passengers go to sleep, even if the amplitude is the same, the vibration is sensed by surrounding persons as if the vibration had a greater amplitude. Therefore, the upper limit vibration is preferably decreased.

Further, the vibration restriction condition may be determined also in consideration of ambient noise, in addition to the person presence information. For example, even if the degree of crowding is the same, when the surrounding is noisy, a person exhibits higher tolerance for sound from surrounding persons. Therefore, the upper limit vibration may be increased. In contrast, when the surrounding is quiet, a person exhibits lower tolerance for sound. Therefore, the upper limit vibration is preferably decreased.

Further, in Embodiment 1, as the vibration restriction condition, a technique of adjusting the upper limit value of the amplitude of the vibration of the vibration section 13 is employed. However, the present disclosure is not limited thereto. For example, a technique of adjusting the overall amplitude amount may be employed. Further, with respect to sound, sound having a higher vibration frequency is easier to be heard. Therefore, a technique of adjusting the vibration frequency may be employed. For example, the vibration section may be controlled such that the higher the degree of crowding is, the lower the upper limit value of the vibration frequency becomes. Further, a parameter other than the vibration amplitude and the vibration frequency may be adjusted. Further, when the degree of crowding is high, the rise of the drive waveform of voltage applied to the piezoelectric elements may be blunted. Blunting the rise of the drive waveform may result in a soft touch vibration, but can suppress noise. Accordingly, nuisance to others can be suppressed. As described above, noise may be suppressed by changing the drive waveform itself.

Further, in Embodiment 1, an existence state of persons other than the operator and being near to the electronic device is determined by using seat booking information. However, the present disclosure is not limited thereto. For example, a current driving status of the movable carrier is obtained, and then, the amplitude of the vibration may be controlled also in consideration of the driving status, in addition to the seat information. For example, the electronic device may be controlled so as not generate an amplitude when the movable carrier is leaving, landing, or running on the ground.

Further, in Embodiment 1, when an electronic device has made an inquiry with the server, the server transmits seat information to the electronic device that made the inquiry. However, every time the server updates seat information, the server may distribute the seat information to all the electronic devices in the information providing system. Further, the server may distribute seat information only to predetermined electronic devices that have been registered in advance.

Further, in Embodiment 1, the seat information of the seats near the user seat is obtained from the server. However, the present disclosure is not limited thereto. Seat information of the seats near the user seat may be obtained through communication with respective electronic devices arranged at seats near the user seat.

Further, in Embodiment 1, the server serves as the management device which manages information (such as person presence information) indicating whether persons are present on the seats for operators who operate the respective electronic devices. However, the present disclosure is not limited thereto. For example, at least one of a plurality of electronic devices may representatively function as the management device.

Further, Embodiment 1 has been described with respect to seats in an aircraft. However, the present disclosure is not limited thereto. For example, the information providing system can be applied to a conveyance such as an automobile, a bus, a train, and a ship, where seats are arranged, and the same effects as described above can be expected. Further, the information providing system can be applied not only to such a conveyance, but also to a construction such as a library, a movie theater, and an amusement attraction in a theme park, where seats are arranged. In the case where electronic devices having a touch-sensing function are provided in such a place, the same effects as described above can be obtained. Further, the environment in which the electronic device is used is not limited to a place where seats are provided. The same effects can be obtained even when the operator operates the electronic device while standing, as in the case of an exhibition hall.

Further, in Embodiment 1, the ambient environment of the electronic device is a person presence state regarding seats near the user seat. However, the present disclosure is not limited thereto. Irrespective of provision of seats, based on information other than a person presence state, an existence state of persons other than the operator of the electronic device and being near to (within a predetermined range of) the electronic device may be detected as detection information. For example, by analyzing an image taken by a camera mounted to a back face or the like of an electronic device, an existence state of persons other than the operator and being near to the electronic device may be detected. It should be noted that an infrared sensor may be used instead of a camera. Accordingly, even when the operator operates the electronic device while standing, the same effects as in Embodiment 1 can be obtained. Further, when there is no person near (within a predetermined range of) the electronic device, time periods, places, and the like may be used as the ambient environment. For example, during night, even when there is no person nearby, a smaller vibration will not cause nuisance to the operator.

Further, in Embodiment 1, the magnitude of the amplitude of the vibration of the vibration section is adjustable by the user. However, the magnitude of the amplitude of the vibration may not be adjustable by the user. In such a case, for example, the vibration section is controlled such that the higher the degree of crowding of persons other than the operator and being near to the electronic device is, the smaller the amplitude of the vibration automatically becomes.

As described above, embodiments have been described as examples of the technology according to the present disclosure. For this purpose, the accompanying drawings and the detailed description are provided.

Therefore, components in the accompanying drawings and the detailed description may include not only components essential for solving problems, but also components that are provided to illustrate the above technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An electronic device comprising:
   a touch panel;
   a vibrator configured to vibrate the touch panel;
   a detector configured to detect a degree of crowding of one or more persons, other than an operator of the electronic device, existing near the electronic device; and
   a controller configured to control an intensity of the vibrator based on the degree of crowding detected by the detector,
   wherein the controller decreases the intensity of the vibrator when the degree of the crowding increases.

2. The electronic device according to claim 1, wherein the controller determines a restriction condition for restricting the intensity of the vibrator based on the degree of crowding, and controls the vibrator so as to satisfy the restriction condition.

3. The electronic device according to claim 1, wherein the controller determines an upper limit value of an amplitude for the vibrator based on the degree of crowding, and restricts the amplitude for the vibrator to a value not greater than the upper limit value.

4. The electronic device according to claim 1, wherein:
   the electronic device is attached on a backside of a seat,
   the controller decreases the intensity of the vibrator when a person exists on the seat.

5. The electronic device according to claim 4, wherein an operator operating the electronic devices is different from the person existing on the seat.

6. The electronic device according to claim 1, comprising:
   an external communicator configured to receive information, from an external device, indicating one or more persons other, other than the operator, existing near the electronic device,
   wherein the detector detects the degree of crowding based on the information obtained through the external communicator.

7. The electronic device according to claim 6, wherein:
   the electronic device is used in an environment where there are a plurality of seats, and
   the external communicator receives the information indicating a person being present on a target seat among the plurality of seats, the target seat being adjacent to a seat of the operator.

8. The electronic device according to claim 7, wherein:
   the plurality of seats have a plurality of target seats, each of which being adjacent to the seat of the operator, and
   the electronic device is used in an environment where there are a plurality of seats, and
   the external communicator receives the information indicating the number of the target seats where persons are seated or positions, relative to the seat of the operator, of the target seats where persons are seated.

9. An information providing system, comprising:
   a plurality of electronic devices each attached on one of a plurality of seats, wherein:
   each of the plurality of the electronic devices comprises:
      a touch panel;
      a vibrator configured to vibrate the touch panel;
      a detector configured to detect a degree of crowding of one or more persons, other than an operator of the electronic device, existing near the electronic device; and
      a controller configured to decrease an intensity of the vibrator when the degree of the crowding increases.

10. The information providing system according to claim 9, wherein:
    one of the plurality of the electronic devices is attached on a backside of one of the plurality of seats, and
    the controller of said one of the plurality of the electronic devices decreases the intensity of the vibrator when a person exists on said one of the plurality of seats.

11. The information providing system according to claim 10, wherein an operator operating said one of the plurality of the electronic devices is different from the person existing on said one of the plurality of seats.

12. The information providing system according to claim 9, wherein:
    the detector detects of a target device, when one of the plurality of electronic devices is defined as the target device, one or more persons, other than an operator of the target device, existing near the target device, as detection information, and
    the controller of the target device controls the vibrator based on the detection information outputted by the detector.

13. The information providing system according to claim 12, wherein:
    each of the electronic devices includes an external communicator configured to communicate with an external device, and
    the detector of the target device detects one or more persons, other than the operator, existing near the target device, based on external information obtained through the external communicator of the target device.

14. The information providing system according to claim 13, further comprising
    a management device configured to manage seat information indicating whether each of the plurality of the seats is seated,
    wherein the detector of the target device detects one or more persons, other than the operator, existing near the target device, based on the seat information obtained as the external information from the management device.

15. The information providing system according to claim 14, wherein the management device comprises a server communicable with the plurality of electronic devices.

16. The information providing system according to claim 14, wherein the management device comprises at least one of the plurality of electronic devices.

17. A method for controlling an electronic device including a touch panel, and a vibrator configured to vibrate the touch panel, the method comprising:
    detecting a degree of crowding of one or more persons, other than an operator of the electronic device, existing near the electronic device; and
    decreasing an intensity of the vibrator when the degree of the crowding increases.

18. The method according to claim 17, wherein:
the electronic device is attached on a backside of a seat, and
the intensity of the vibrator is decreased when a person exists on the seat.

19. The method according to claim 18, wherein an operator operating said one of the plurality of the electronic devices is different from the person existing on the seat.

\* \* \* \* \*